United States Patent [19]
Johnson et al.

[11] Patent Number: 5,483,618
[45] Date of Patent: Jan. 9, 1996

[54] METHOD AND SYSTEM FOR DISTINGUISHING BETWEEN PLURAL AUDIO RESPONSES IN A MULTIMEDIA MULTITASKING ENVIRONMENT

[75] Inventors: William J. Johnson, Flower Mound; Marvin L. Williams, Lewisville, both of Tex.

[73] Assignee: International Business Machines Corporation, Armonk, N.Y.

[21] Appl. No.: 814,738

[22] Filed: Dec. 26, 1991

[51] Int. Cl.$^6$ .................................................. G10L 3/00
[52] U.S. Cl. ...................... 395/2.79; 395/2.24; 395/2.62
[58] Field of Search ........................... 345/2, 725; 381/51

[56] References Cited

U.S. PATENT DOCUMENTS

| | | | |
|---|---|---|---|
| 4,449,232 | 5/1984 | Hashimoto et al. | 395/2 |
| 4,455,551 | 6/1984 | Lemelson | 395/2 |
| 4,560,978 | 12/1985 | Lemelson | 395/2 |
| 4,914,705 | 4/1990 | Nigawara | 381/51 |

OTHER PUBLICATIONS

Ludwig et al., "Extending the Notion of a Window System to Audio", Computer, Aug. 1990, Publ. by IEEE Computer Society, vol. 23, No. 8, pp. 66–72.

*Primary Examiner*—David D. Knepper
*Attorney, Agent, or Firm*—Geoffrey A. Mantooth

[57] ABSTRACT

In a data processing system having plural processes being executed concurrently thereon, with each process producing audio responses, there is provided a method and system for synchronizing the audio responses so that only one process at a time "speaks" to a user through an audio output device. The audio responses of a process are intercepted by a sequencer which determines if the audio output device is available for accessing. If the audio output device is available, then the sequencer provides the intercepted audio responses to the audio output device. If the audio output device is not available, then the sequencer delays the provision of the audio responses until the audio output device becomes available. Furthermore, notification is given to the user so that the particular process which is speaking through the audio output device can be identified. Notification can be by aural characteristics, such as frequency or pitch, or by graphically displaying the identifying information to the user.

12 Claims, 4 Drawing Sheets

METHOD AND SYSTEM FOR DISTINGUISHING BETWEEN PLURAL AUDIO RESPONSES IN A MULTIMEDIA MULTITASKING ENVIRONMENT

FIELD OF THE INVENTION

The present invention relates to data processing methods and systems for distinguishing between plural audio responses in a multimedia multitasking environment.

BACKGROUND OF THE INVENTION

Desk top computers are being used more and more often to perform plural applications concurrently. For example, a user can concurrently access and utilize a spreadsheet application program and a word processing application program.

Each application program can communicate with the user in a variety of ways. This is referred to as multimedia and includes visually displaying data, text, graphics or video, and providing an audio response. An application program speaks to a user by providing an audio response to an audio output device, such as a speaker. The audio response can be simple, taking the form of tones or beeps, or it can be more complex, mimicking human speech. An example of a complex audio response is a text-to-speech operation where speech is digitally synthesized.

Application programs providing audio responses are designed under the assumption that only one application program at a time will speak to a user. Therefore, problems arise when a user concurrently uses two or more application programs that provide audio responses. When two or more programs are running on a computer at the same time, the user may be unable to identify which particular application program is speaking at any given time, because the application programs do not identify themselves. Another problem arises if two or more of the application programs speak at the same time. The user can be easily confused and may be unable to understand what was said. Worse yet, the application programs could speak and their combined message produce an unintended result. For example, a first application program could say "erase", followed by a second application program saying ". . . all files". Each application program masks part of the other application program's message. The resulting message "erase all files" could erroneously cause the user to erase all of his files.

SUMMARY OF THE INVENTION

It is therefore an object of the present invention to provide a method and a system wherein only one application program speaks at a time.

It is a further object of the present invention to provide a method and a system wherein the user is able to distinguish between plural application programs speaking, such that the user is able to identify which application program is speaking at any given time.

In a multitasking environment, plural application programs are allowed to run concurrently on a data processing system. Some of these application programs can "speak" to a user by providing audio responses to an audio output device. If two or more of the application programs speak to the user at the same time, then misunderstanding and confusion on the part of the user can easily occur.

The present invention solves this problem by synchronizing the audio responses produced by the application programs such that only one application program is allowed to speak at a time. In addition, the audio responses of each application program are distinguished from the audio responses of the other application programs, so that the user can identify which particular application program is speaking. The audio responses can be distinguished aurally by assigning different frequency ranges or pitches to the audio output produced by the speaker. Alternatively, the audio responses can be distinguished by graphically providing information on a display as to which application program is speaking.

The present invention distinguishes between respective audio responses of plural processes. The audio responses are identified according to which ones of the processes have produced the respective audio responses. The times that the intercepted audio responses are provided to the user interface are synchronized such that at any given time only the audio responses that have been produced by a single one of the processes are provided to the user interface.

In one aspect, the present invention further includes notifying a user at the user interface which particular process is providing the respective audio responses to the user interface.

In still another aspect, the present invention determines from pauses in the audio responses if the one process that is providing the respective audio responses to the user interface is finished providing the respective audio responses. If so, then another process is allowed to provide its respective audio responses to the user interface.

BRIEF DESCRIPTION OF THE DRAWINGS

FIG. 3 is a flow chart that describes how an application program is registered. FIGS. 4–5 are flow charts that describe how audio responses are handled by the sequencer when a speaker request is received from an application program. FIG. 6 is a flow chart that describes how the queue in the sequencer is managed.

DESCRIPTION OF PREFERRED EMBODIMENT

Figure 1:
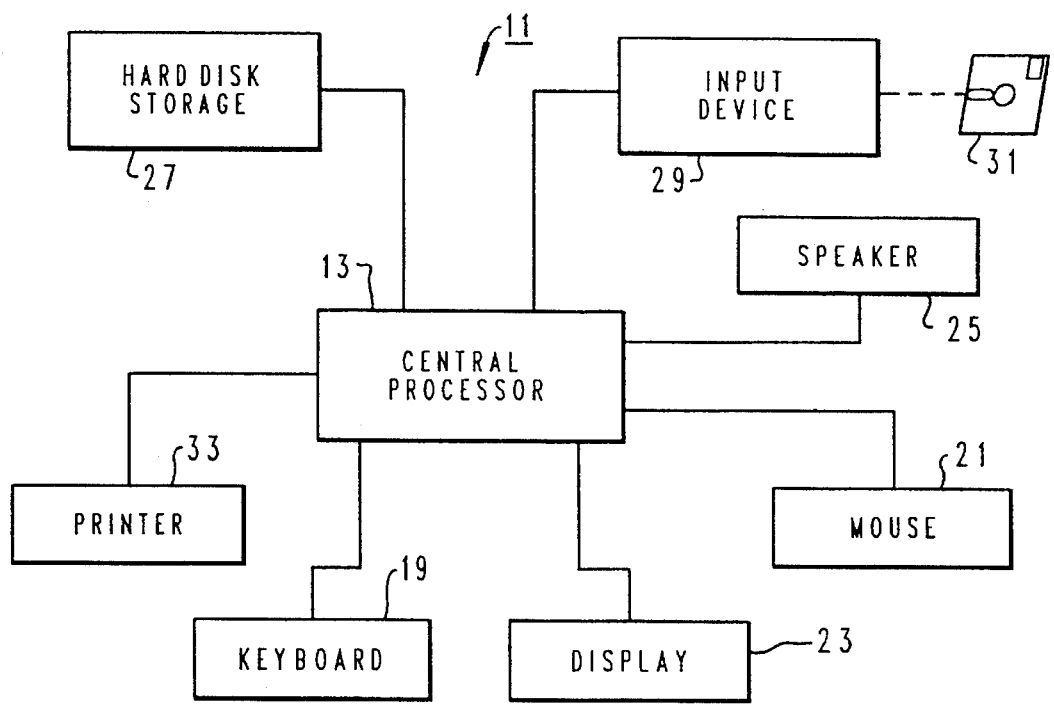
FIG. 1 is a block diagram showing a data processing system in accordance with the present invention.

In FIG. 1, there is shown a data processing system 11. The system has a central processor 13, and its associated memory, such as RAM and/or ROM, located therein. Peripheral devices are connected to the processor. Input devices in the form of a keyboard 19 and a mouse 21, are connected to the processor 13. Output devices, in the form of a display 23 and a speaker 25, or audio output device, are also connected to the processor. The display 23 has a display screen for graphically representing information to a user, while the speaker 25 presents audio responses to the user in the form of audio outputs. The speaker 25 may contain a microphone for allowing a user to speak to the data processing system. One or more speakers may be provided. Memory devices, in the form of hard disk storage 27 and an input device 29, are connected to the processor. The input device 29 accepts and reads a medium 31 with computer program logic recorded thereon, which logic implements the present invention. The particular medium 31 may include a floppy disk or a magnetic tape. There is also provided a printer 33 connected with the processor 13.

Figure 2:
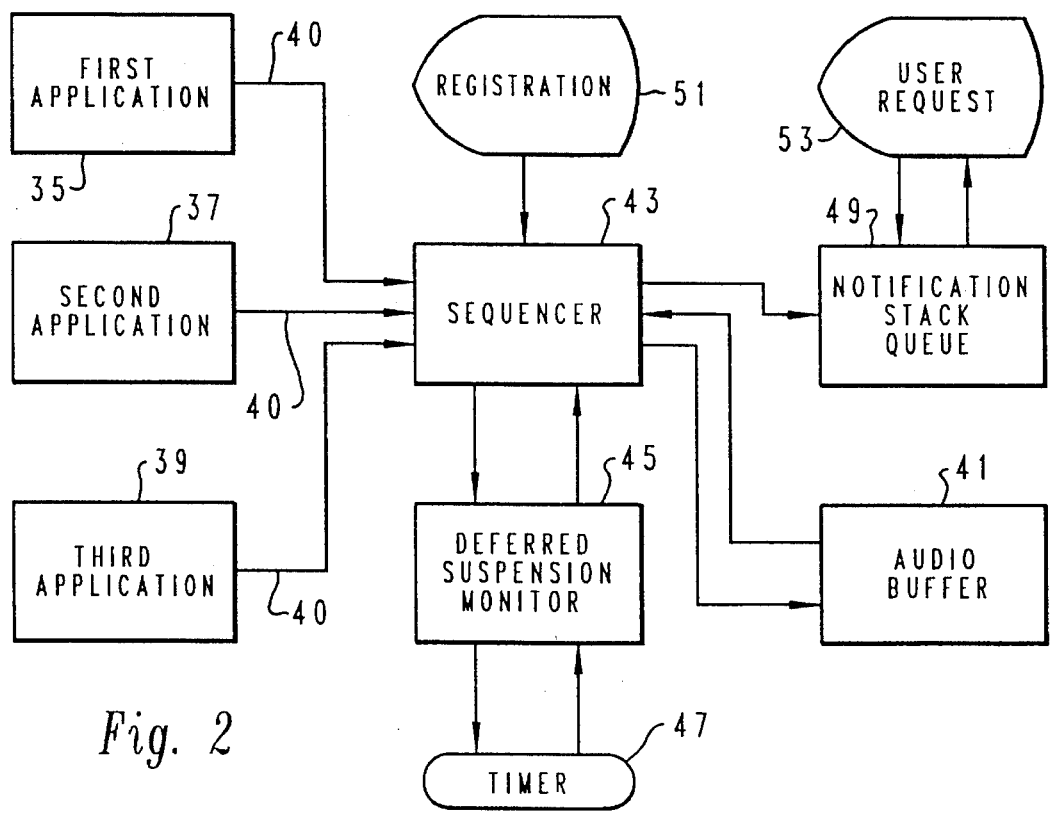
FIG. 2 is a component flow diagram showing software components of the present invention, in accordance with a preferred embodiment.

In FIG. 2, there is shown a component flow diagram of the present invention, which diagram illustrates the software components of the present invention. Plural application programs are provided, namely a first application 35, a second application 37 and a third application 39. The data processing system 11 supports multitasking operations, wherein a single user may be running two or more of these application programs at the same time on the data processing system. If the data processing system has only a single processor, then the application programs are executed one at a time on the processor, but their execution appears to be concurrent to the user.

The application programs all provide some type of audio responses to the speaker 25. The audio responses may be in the form of beeps, tones, analog representations, text-to-speech, etc. The audio response channels 40 of the application programs communicate with an audio buffer 41 by way of a sequencer 43. The audio buffer 41 communicates, by way of a speaker address, with the speaker 25. There may be one or more speakers, with each application program having its own speaker.

The sequencer 43 bidirectionally communicates with the audio buffer 41 and to a deferred suspension monitor 45. The deferred suspension monitor 45 bidirectionally communicates with a timer 47. The timer 47 is the clock for the data processing system 11. The sequencer 43 also communicates with a notification stack queue 49. Two user interfaces are provided, namely a registration interface 51 and a user request interface 53. The registration interface 51 communicates with the sequencer 43, while the user request interface 53 bidirectionally communicates with the notification stack queue 49.

Before the audio responses of the application programs can be routed through the sequencer, their respective audio responses must somehow be electronically distinguished from each other. This allows the sequencer 43 to identify which application program is speaking. In the preferred embodiment, the user registers, through the registration interface 51, the application programs 35, 37, 39 that are to be used. In addition, the user defines how the audio outputs of the application programs are to be distinguished from each other.

Once registered, the application programs can be executed so as to run concurrently. When, for example, the first application program 35 speaks, its audio responses are routed to the sequencer 43. In the sequencer 43, it is determined if another application program is currently speaking to the user through the speaker 25. If there is no other application program speaking, then the audio responses of the first application program 35 are routed directly to the audio buffer 41, wherein the speaker 25 produces the audio output represented by the audio responses. If there is another application program speaking, then the sequencer 43 stores the audio responses of the first application program 35 in a queue. In the queue, it waits until the other application program is through speaking, wherein the audio responses of the first application are loaded into the audio buffer 41 and thence on to the speaker.

The deferred suspension monitor 45 is checked by the sequencer 43 to determine when an application program is done speaking. The deferred suspension monitor 45 is used to allow application programs to mimic human speech by including pauses between words and sounds. The deferred suspension monitor 45 evaluates these pauses to determine if an application program is merely pausing before going on to speak or if the application program is done speaking for the time being.

The method of the present invention will now be described with reference to the flow charts of FIGS. 3–6. In the flow charts, the following graphical conventions are observed: a diamond for a test or decision, a rectangle for a process or function and a circle for a connector in exiting to or entering from another part of the flow chart. These conventions are well understood by those skilled in the art, and the flow charts are sufficient to enable one skilled in the art to write code in any suitable computer programming language, such as BASIC, PASCAL or C for a computer such as the IBM Personal System/2 (PS/2) family of computers which supports these languages.

Figure 3:
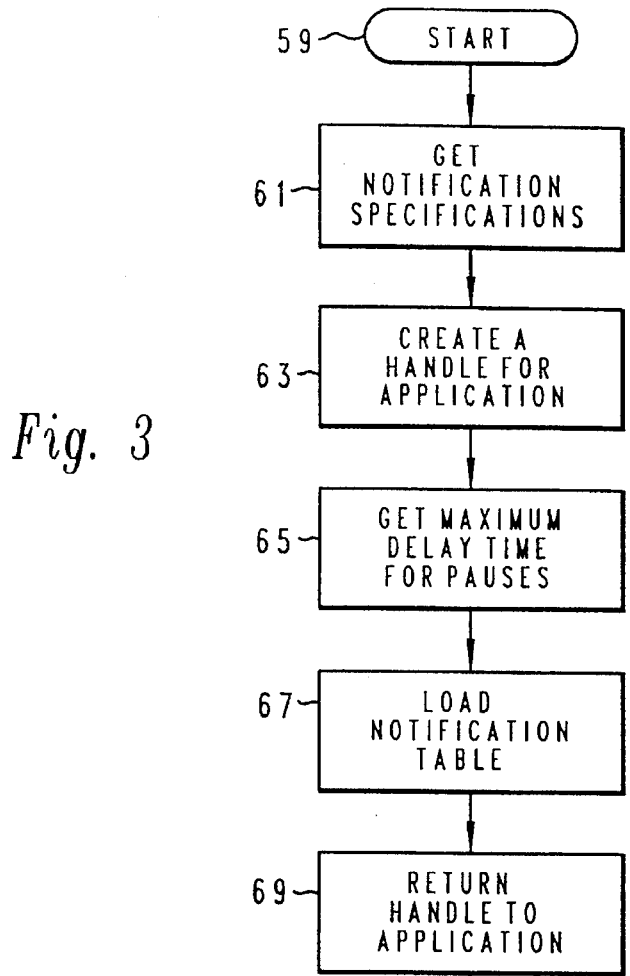
FIGS. 3–6 are flow charts showing the method of the present invention.

In FIG. 3, the registration process is shown. The registration process allows the user to assign identifying information to each application program, wherein the user can identify which application program is speaking. After starting and initializing the process, step 59, the method obtains notification specifications from the user, step 61. The notification specifications are used to notify the user which particular application program is speaking through the speaker 25. The notification specifications can be aural or it can be graphical. Aural notification specifications include selecting the pitch or frequency range at which the audio response of the application program is generated by the speaker. For example, in text-to-speech processes, the user can use a male voice to identify the speech of one application program and a female voice to identify the speech of another application program. Graphical notification specifications include a visual notification being presented to the user by way of the display 23.

The next step 63 creates a unique handle, or identifier, for the application program being registered. The handle allows the sequencer 43 to identify which application program is speaking so that it can determine which notification specifications should be used. The next step 65 obtains from the user the maximum delay time for pauses between the audio responses of the application program. For example, the user may input a three second maximum pause. This maximum pause allows an application program to speak with short pauses, up to three seconds in the example, between sounds. Thus, when one application pauses for three seconds or longer, another application could speak.

In the next step 67, the method loads the notification table. The notification table contains the notification specifications for the particular handle. In step 69, the method returns the handle to the application program being registered. This step informs the particular application program what handle has been assigned to it. The registration method then stops, step 71.

Figure 4:
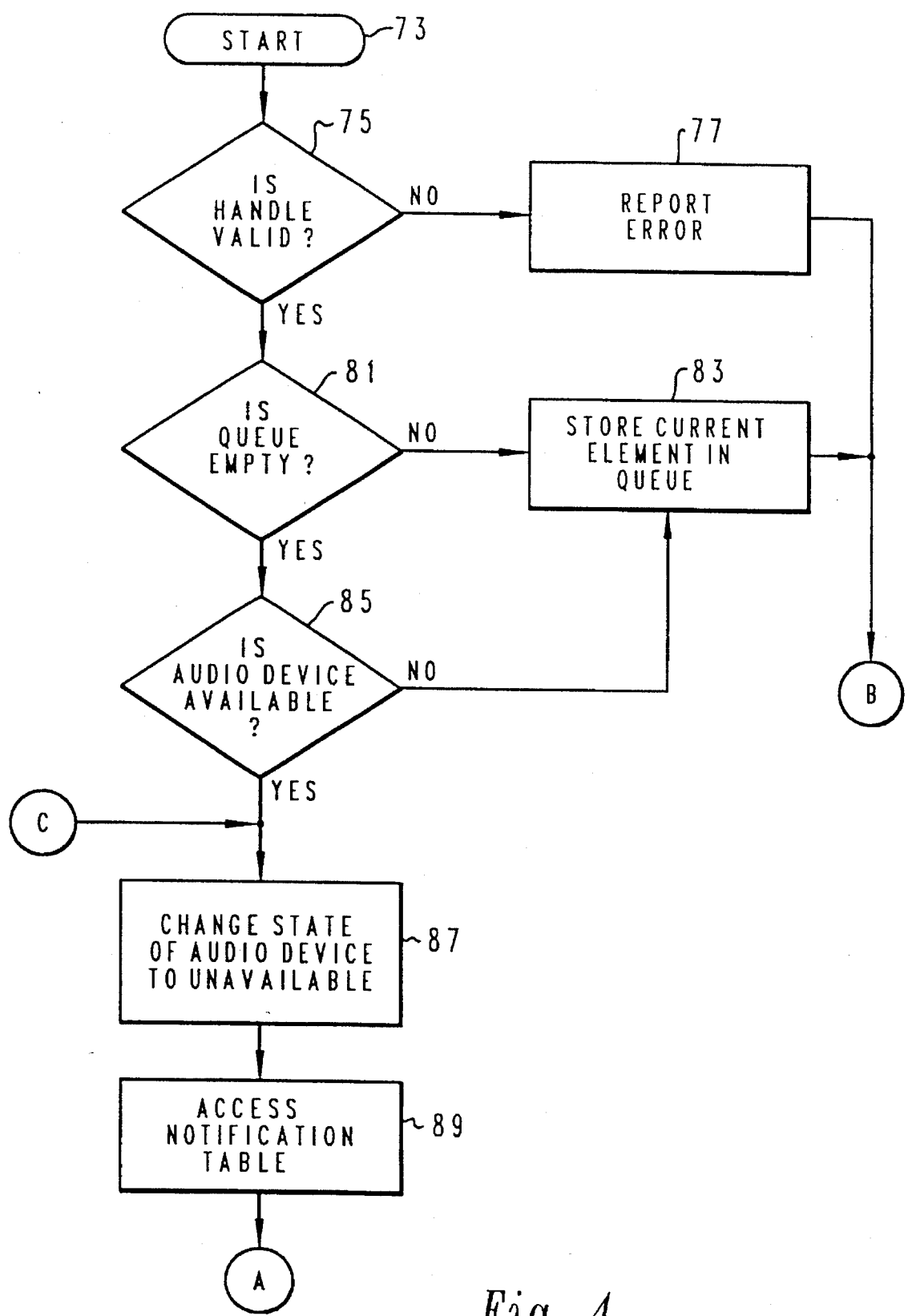
Figure 5:
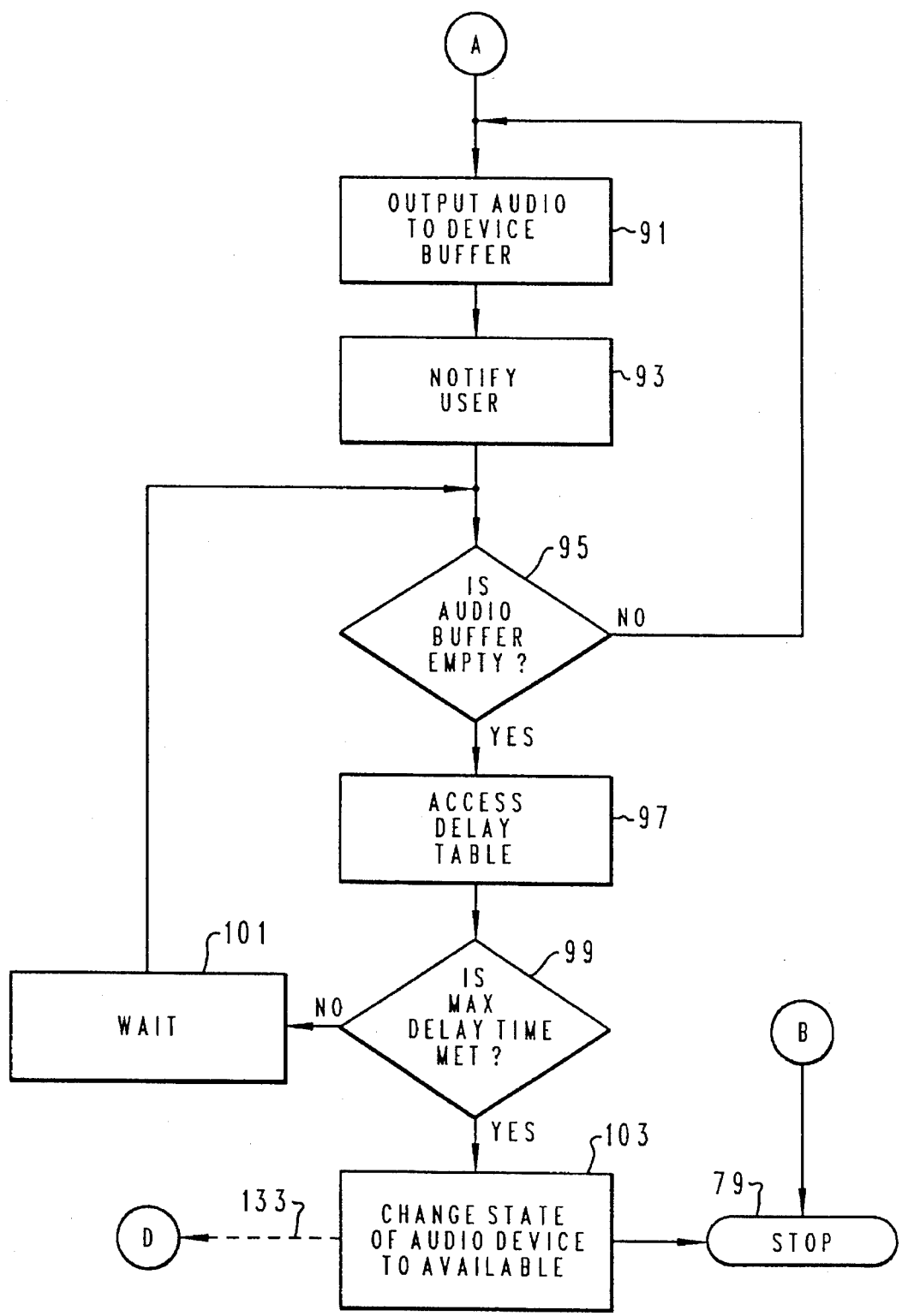

In FIGS. 4 and 5, the speaker request process is shown. The speaker request process, which is run in the sequencer 43, is used when an application program produces a request to speak together with audio responses to be output to the speaker. The speaker request process synchronizes the audio responses coming through so that only one application program speaks at any given time. Synchronization is achieved by determining if the audio output device, or speaker 25, is available. If it is available, then the incoming audio responses are routed to the audio buffer 41. In addition, the audio output device is made unavailable to prevent other application programs from speaking. If the audio output device is not available, thus indicating that another application program is speaking, then the audio responses are delayed by being routed to a queue in the sequencer. Once in the queue, the queue manager process, shown in FIG. 6, takes over the management of the audio responses. The queue manager process determines if the audio output device is available. If it is not available, the queue manager process waits until the audio output device is finally available. Once the audio output device is available, the audio responses are routed to the audio buffer for output to the audio output device. In addition, the queue manager process makes the audio output device unavailable to prevent other application programs from speaking. Subsequently arriving audio responses from other application programs are routed to the queue to await the availability of the audio output device.

When an application program is ready to speak, it outputs to the sequencer a request to speak, a handle and the audio responses. Referring to FIG. 4, upon receipt of the request to speak, the speaker request process is started and initialed, step 73. Then, the determination is made of whether the handle of the application program is valid, step 75. If NO, the handle is not valid, the method proceeds to step 77, where the error is reported. The error can be reported by way of an end user interface, where the error is displayed on the user screen or where there may be some type of logging mechanism to record the error. After step 77, the process stops, step 79 (see FIG. 5).

If the result of step 75 is YES, the handle is valid, then the method proceeds to determine if the audio responses should be routed directly to the audio buffer 41 or if instead the audio responses should be delayed by storing it on a queue. In step 81, the method determines if the queue is empty. The queue is in the sequencer 43 and is used to store audio responses of application programs waiting to be transferred to the audio buffer 41. If the result of step 81 is NO, the queue is not empty, then that indicates that the audio responses of another application is already waiting in the queue to be transferred to the audio buffer. Thus, the method proceeds to step 83 where the current element is stored in the queue. The element includes the speaker request, the handle and the audio responses from the application program seeking to access the speaker. After being stored on the queue, the method stops, step 79, and waits for the audio buffer to become empty. Once the queue is loaded with information, step 83, the queue manager routine of FIG. 6 manages the unloading of the queue into the audio buffer. The queue manager routine will be discussed in more detail hereinafter.

If the result of step 81 is YES, the queue is empty, then the method proceeds to step 85 to determine if the audio output device, or speaker 25, is available. If NO, then in step 83, the current element is stored in the queue. If the result of step 85 is YES, then the state of the audio output device is changed to unavailable, step 87. This prohibits subsequently arriving audio responses from other application programs from accessing the speaker, while the current application program is accessing the speaker.

In step 89, the notification table is accessed to determine how to notify the user that this particular application program is speaking. The notification table was loaded during the registration process of FIG. 3. Next, referring to FIG. 5, the audio responses are output to the audio buffer 41, step 91. If the notification is aural, then the audio output itself notifies the user as to which application program is speaking. If the notification is graphical, then in step 93, the graphical notification is provided by way of the notification stack queue 49. A user can access the notification stack queue 49 by way of the user request 53 (see FIG. 2). For example, a user can pop up a window on the display 23 and identify which application program is speaking. In addition, the notification stack queue 49 can be used to display the text of what is being produced by the speaker 25. This is particularly useful in text-to-speech processes and allows the user to both see and hear the application program.

The next step 95 determines if the audio buffer is empty. If NO, then the method loops back to step 91 to continue to output the audio responses.

If the result of step 95 is YES, then the delay table is accessed, step 97, to determine if the audio buffer is empty merely because of a pause between words or because the application program is finished speaking for the present time. The delay table is created during the registration process, shown in FIG. 3. The delay table is accessed in step 97 and the delay times stored therein are used in step 99. In step 99, the method determines if the maximum delay time is met. The sequencer 43, FIG. 2, queries the deferred suspension monitor 45, which utilizes the timer 47. If the result of step 99 is NO, then the method waits, step 101, and loops back to step 97. A NO results when an application program has paused in its speaking, but this pause has not yet equaled the maximum delay time. For example, if the maximum delay time for the particular application program that is speaking is three seconds, then step 99 determines if three seconds has passed since the application program last spoke. If less than three seconds has passed, the method waits, step 101, for either the maximum delay time to expire or for another audio response to be produced by the respective application program. The method then returns to step 97 to determine if the application program has any additional audio responses in the audio buffer. If there are additional audio responses in the audio buffer, then they are sent to the speaker 25. If more than three seconds has passed since the last audio response, then the method proceeds to step 103, where the state of the audio output device is changed to available. This frees the audio output device so that other application programs can access it. After step 103, the method stops, step 79. When another application program produces a speaker request, then the speaker request process of FIG. 4 begins again, step 73.

Figure 6:
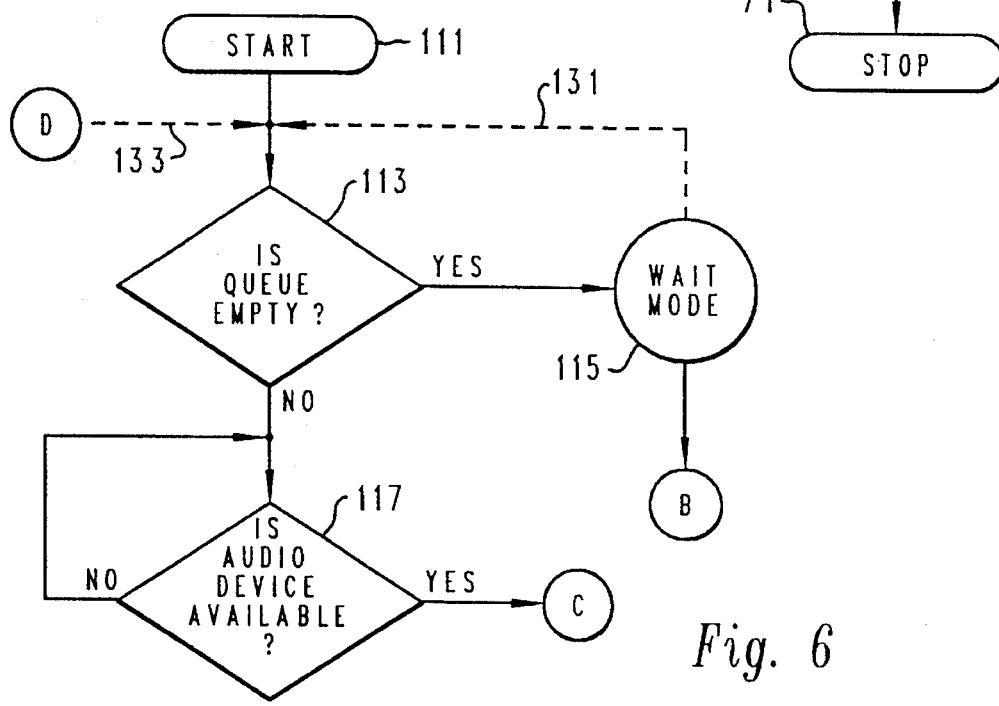

Referring now to FIG. 6, the disposition of delayed audio responses will be explained. Delayed audio responses are stored on the queue. The queue manager process of FIG. 6 unloads the queue to the audio buffer 41. The queue manager process is started and initialized, step 111. Then, a determination is made if the queue is empty, step 113. If YES, the queue is empty, then the method proceeds to step 115, where it enters a wait mode. If NO, the queue in not empty, then the method proceeds to step 117, where it is determined if the audio output device is available. If NO, the audio output device is not available (because another application program is accessing it), then the method loops back to step 117 to wait for the audio output device to become available. Once the audio output device is available, YES, the method proceeds to step 87 (see FIG. 4), where the state of the audio output device is changed to unavailable. The queue manager process then follows the same steps as the speaker request process of FIGS. 4 and 5, wherein the audio responses are output to the audio buffer 41.

When the queue manager process is in the wait mode, step 115, it waits for something to be stored in the queue. In one embodiment, the queue manager process waits by stopping, step 79 as shown in FIG. 5. This embodiment is a non-polling mode which waits for some event to restart the process. In another embodiment, the queue manager process proceeds (as shown by dashed line 131 in FIG. 6) from the wait mode 115 to step 113. This other embodiment 131 polls the queue to see if anything has been stored therein. Polling can also be utilized after step 103 in FIG. 5. As shown in the dashed line 133, after step 103, the queue manager process proceeds to step 113 in FIG. 6 to determine if the queue is empty.

The sequencer 43 as described herein operates on a first-in first-out basis. That is, the first application program to request to speak is allowed to do so without interruption. Other application programs that subsequently request to speak are allowed to speak in turn. The sequencer 43 could be set up in other management modes. For example, the first application program 35 could be given priority, so that whenever it is ready to speak, the other application programs must wait. The first application program would also interrupt any other application program that is currently speaking.

The maximum delay time can be input by the user during the registration process, as described. Alternatively, the application programs can provide their own maximum delay time. In addition, the length of maximum delay time can be dynamic so as to change during processing. Dynamic control can either be by an application program or by the user. When controlled by an application program, the application program can make more efficient use of the speaker 25 by changing the maximum delay time to suit the particular circumstances of the task. When controlled by the user, the user utilizes the notification stack queue 49 to set the maximum delay time. This allows him to "fine tune" the delay during processing.

Although the present invention has been described in conjunction with a system 11 having only a single speaker 25 and with all of the applications programs accessing that speaker, the present invention can be used with systems having plural speakers or audio output devices. The present invention would ensure that only one application program is speaking at a time so that the user is not confused by plural speakers speaking at the same time.

The foregoing disclosure and the showings made in the drawings are merely illustrative of the principles of this invention and are not to be interpreted in a limiting sense.

We claim:

1. A method for processing audio responses from an audio output means of a data processing system, said audio responses being produced by plural processes that are executed on said data processing system, said respective processes producing said respective audio responses with pauses between sounds located in said respective audio responses, comprising the steps of:

a) identifying said audio responses according to which ones of said processes produced said respective audio responses;

b) synchronizing the times that said identified audio responses are provided to said audio output means such that at any given time only said audio responses that have been produced by a single one of said processes are provided to said audio output means; and c) said step of synchronizing the times that said identified audio responses are provided to said audio output means further comprises the step of determining from said pauses if one of said processes that is providing said respective audio responses to said audio means is finished providing said respective audio responses, and if so, then allowing another process to provide its respective audio responses to said audio output means.

2. The method of claim 1 further comprising the step of notifying a user using said audio output means which particular process is providing said respective audio responses to said audio output means.

3. The method of claim 1, wherein said step of determining from said pauses if one of said processes that is providing said respective audio responses to said audio output means is finished providing said respective audio responses further comprises the step of determining if any one of said pauses meets a predetermined maximum delay time, wherein if any one of said pauses meets a predetermined maximum delay time, then providing audio responses from another process to said audio output means.

4. A method for processing audio responses from an audio output means of a data processing system, said audio responses being produced by plural processes that are executed on said data processing system such that each one of said processes produces its own audio responses, wherein said respective processes produce said respective audio responses with pauses between sounds located in said respective audio responses, comprising the steps of:

a) detecting the production of said audio responses by one of said processes;

b) determining the availability of said audio output means, said audio output means being available if there are no audio responses of any of said processes other than said one detected process being provided to said audio output means, said audio output means being unavailable if there are audio responses of any of said processes other than said one detected process being provided to said audio output means;

c) if said audio output means is available, then providing said audio responses of said one detected process to said audio output means; and d) if said audio output means is unavailable, then delaying the provision of said audio responses of said one detected process to said audio output means until said audio output means becomes available; and e) said step of determining the availability of said audio output means for said audio responses from said one detected process further comprises the step of determining from said pauses if said process that is providing said respective audio responses to said audio output means is finished providing said respective audio responses, and if so, then allowing said one detected process to provide its respective audio responses to said audio output means.

5. The method of claim 4, wherein said step of determining from said pauses if one of said process that is providing said respective audio responses to said audio output means is finished providing said respective audio responses further comprises the step of determining if any one of said pauses meets a predetermined maximum delay time, wherein if any one of said pauses meets a predetermined maximum delay time, then making said audio device available to audio responses from said one detected process.

6. The method of claim 4 further comprising the step of providing notification to a user using said audio output means which particular one of said processes is producing said audio responses that are being provided to said audio output means.

7. The method of claim 6 wherein said notification is by aural means such that the audio responses produced by each of said processes are produced by said audio output means with aural characteristics that are unique with respect to the audio responses produced by said other processes.

8. The method of claim 6 wherein said notification is by graphical means such that said data processing system graphically presents to said user identification information to notify said user.

9. A data processing system, said data processing system being capable of executing plural processes concurrently thereon, with each of said processes producing respective audio responses that are provided to an audio output means of said data processing system, wherein said respective processes produce said respective audio responses with pauses between sounds located in said respective audio responses comprising:

a) means for identifying said audio responses according to which ones of said processes produced said respective audio responses;

b) means for synchronizing the times that said identified audio responses are provided to said audio output means such that at any given time only said audio responses that have been produced by a single one of said processes are provided to said audio output means; and c) means for determining from said pauses if said one detected process that is providing said respective audio responses to said audio output means is finished providing said respective audio responses, and if so, then for allowing another process to provide its respective audio responses to said audio output means.

10. The data processing system of claim 9, wherein said means for determining from said pauses if one of said processes that is providing said respective audio responses to said audio output means is finished providing said respective audio responses, further comprises means for determining if any one of said pauses meets a predetermined maximum delay time, wherein if any one of said pauses meets a predetermined maximum delay time, then for providing audio responses from another process to said audio output means.

11. A data processing system, said data processing system being capable of executing plural processes thereon, with each of said processes producing respective audio responses that are provided to an audio output means of said data processing system, wherein said respective processes produce said respective audio responses with pauses between sounds located in said respective audio responses, comprising:

a) means for detecting the production of said audio responses by one of said processes;

b) means for determining the availability of said audio output means, said audio output means being available if there are no audio responses of any of said processes other than said one detected process being provided to said audio output means, said audio output means being unavailable if there are audio responses of any of said processes other than said one detected process being provided to said audio output means;

c) means for synchronizing the provision of said audio responses to said audio output means so that if said audio output means is available, then said audio responses of said one detected process are provided to said audio output means, and if said audio output means is unavailable, then delaying the provision of said audio responses of said one detected process to said audio output means until said audio output means becomes available; and d) means for determining from said pauses if said one detected process that is providing respective audio responses to said audio output means is finished providing said respective audio responses, and if so, then for allowing another process to provide its respective audio responses to said audio output means.

12. The data processing system of claim 11, wherein said means for determining from said pauses if one of said processes that is providing said respective audio responses to said audio output means is finished providing said respective audio responses, further comprises means for determining if any one of said pauses meets a predetermined maximum delay time, wherein if any one of said pauses meets a predetermined maximum delay time, then for making said audio device available to audio responses from other processes.

\* \* \* \* \*